Oct. 21, 1952 C. A. GUSTAFSON 2,614,644
TRACTOR STEERING MECHANISM
Filed Jan. 3, 1949 8 Sheets-Sheet 1

FIG-1.

INVENTOR.
Carl A. Gustafson
BY Charles M. Fryer
ATTORNEY.

Oct. 21, 1952 — C. A. GUSTAFSON — 2,614,644
TRACTOR STEERING MECHANISM
Filed Jan. 3, 1949 — 8 Sheets-Sheet 4

Fig. 4.

INVENTOR.
Carl A. Gustafson
BY Charles M. Fryer
ATTORNEY.

Patented Oct. 21, 1952

2,614,644

UNITED STATES PATENT OFFICE 2,614,644

TRACTOR STEERING MECHANISM

Carl A. Gustafson, Peoria, Ill., assignor to Caterpillar Tractor Co., Peoria, Ill., a corporation of California Application January 3, 1949, Serial No. 68,777

7 Claims. (Cl. 180—79.2)

This invention relates to steering mechanisms and particularly to a mechanism for effecting articulation or steering between a pivotally connected draft vehicle and drawn vehicle.

The invention is especially useful in connection with the steering of a two-wheel tractor employed in drawing a vehicle or implement such as a scraper and will be illustrated and described herein in such application though there are numerous other uses to which it may be put.

In the past, several different types of hydraulic steering controls have been provided for two-wheel tractors comprising hydraulic jacks which are supplied with fluid pressure controlled by the tractor steering wheel. However, the control is generally arranged to effect steering upon turning of the wheel and to continue to direct fluid to the jacks to effect turning of the tractor relative to the drawn vehicle until such time as the steering wheel is again returned to its normal position. This is not desirable as it does not give the operator the usual feel of steering and unduly complicates his work. Furthermore, conventional hydraulic steering controls for two-wheel tractors are in most cases provided with a single pair of hydraulic jacks or even a single jack which must be very large to provide torque for steering and are incapable of effecting a sharp turn wherein the tractor assumes a position at right angles to the drawn vehicle.

It is, therefore, an object of this invention to provide a steering control for a two-wheel tractor comprising two pairs of hydraulic jacks for effecting steering, the jacks being arranged to double the turning torque obtainable with a single pair of hydraulic jacks.

Another object of this invention is to provide two pairs of hydraulic jacks for steering a two-wheel tractor, the jacks being arranged to work simultaneously in effecting a 90° turn of the tractor relative to a drawn vehicle.

Another object of this invention is to provide a steering mechanism with two pairs of hydraulic jacks for effecting steering of a two-wheel tractor in which the pistons and the connecting rods of the jacks have suitable fluid passages to reduce the necessity of exterior pipe and connections.

Another object of this invention is to provide steering mechanism with jacks supplied with fluid pressure by a fluid supply circuit controlled by a steering wheel in a manner to supply fluid to the jacks only when the steering wheel is being turned.

Another object of this invention is to provide steering mechanism having jacks supplied with fluid pressure by a fluid supply circuit controlled by a steering wheel in which the rate of fluid flow to the jacks changes in response to the speed at which the steering wheel is turned.

Other objects and advantages of this invention are made apparent in the following specification by reference to the accompanying drawings.

Figure 1:
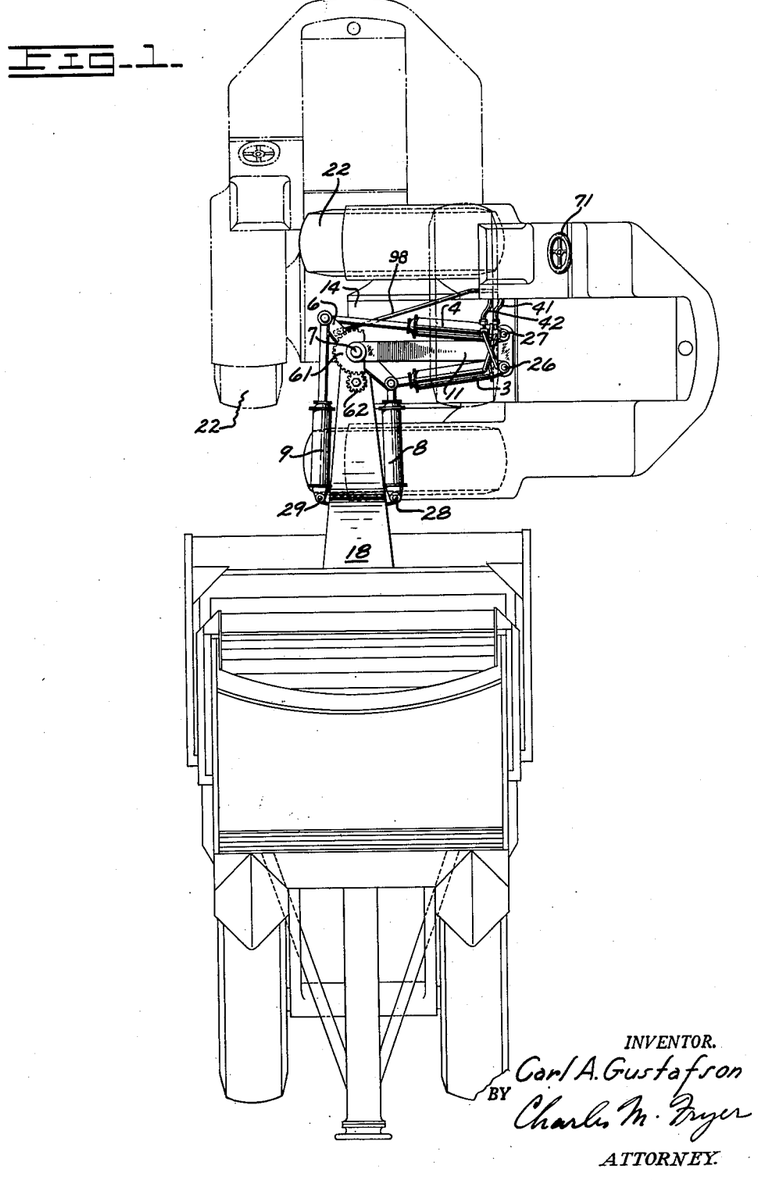
Fig. 1 is a plan view of a two-wheel tractor and scraper combination, the tractor being shown turned 90° relative to the scraper.

The steering arrangement for the combination two-wheel tractor and scraper, as shown in Fig. 1 of the drawings, comprises two pairs of hydraulic jacks. A pair of hydraulic jacks 3 and 4 are each pivoted at one end on a part of the tractor, while their opposite ends are pivotally connected to arms of a lever 6 that is free to rotate about the axis of a king pin 7. The other pair of jacks 8 and 9 are each pivoted at one end to the scraper while their opposite ends are likewise pivoted to arms on the lever 6 in a manner to be subsequently described.

Figure 2:
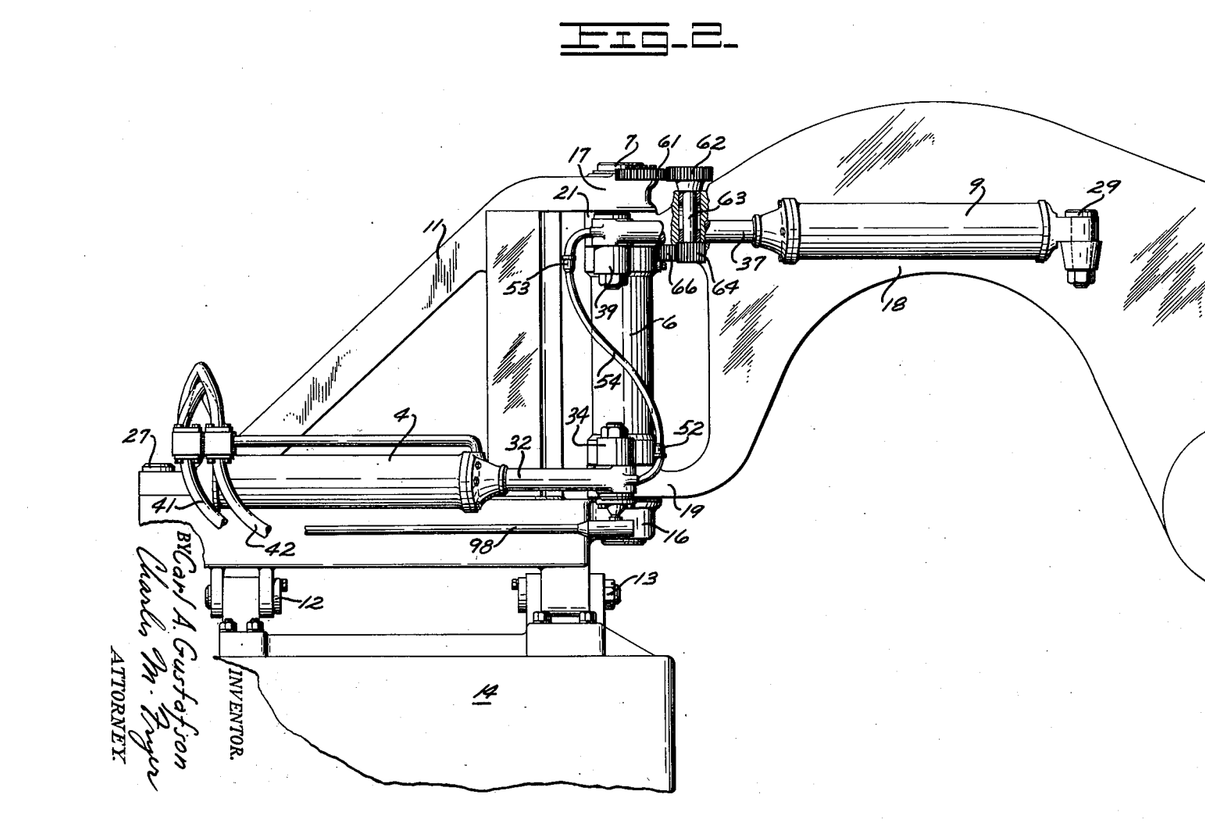
Fig. 2 is an enlarged fragmentary side elevational view of the steering arrangement and hitch between the tractor and the scraper, portions of the view being broken away and shown in section to more clearly illustrate the mechanism.

As shown in Fig. 2, a bracket 11 is hinged as at 12 and 13 to the tractor frame 14, the axes of the hinge connections 12 and 13 being aligned. Bracket 11 is provided with spaced bearings 16 and 17, while the draft connection 18 of the scraper is provided with spaced bearings 19 and 21 and received between the bearings 19 and 21 is the hub of a four armed lever 6 which is free to turn about the axis of king pin 7. Lever 6, as best shown in Figs. 2 and 3, is provided with spaced arms to each of which one end of one of the jacks 3, 4, 8 and 9 is pivotally connected.

The bearings 16, 17, 19 and 21 and the lever 6 are all provided with bored passages through which the king pin 7 is extended to permit turning of the bracket 11 relative to the scraper draft frame 18. Thus, the tractor is free to swing relative to the scraper about the king pin 7. Moreover, the hinge connections 12 and 13 of bracket 11 permit relative lateral rocking of the scraper and the tractor.

Figure 3:
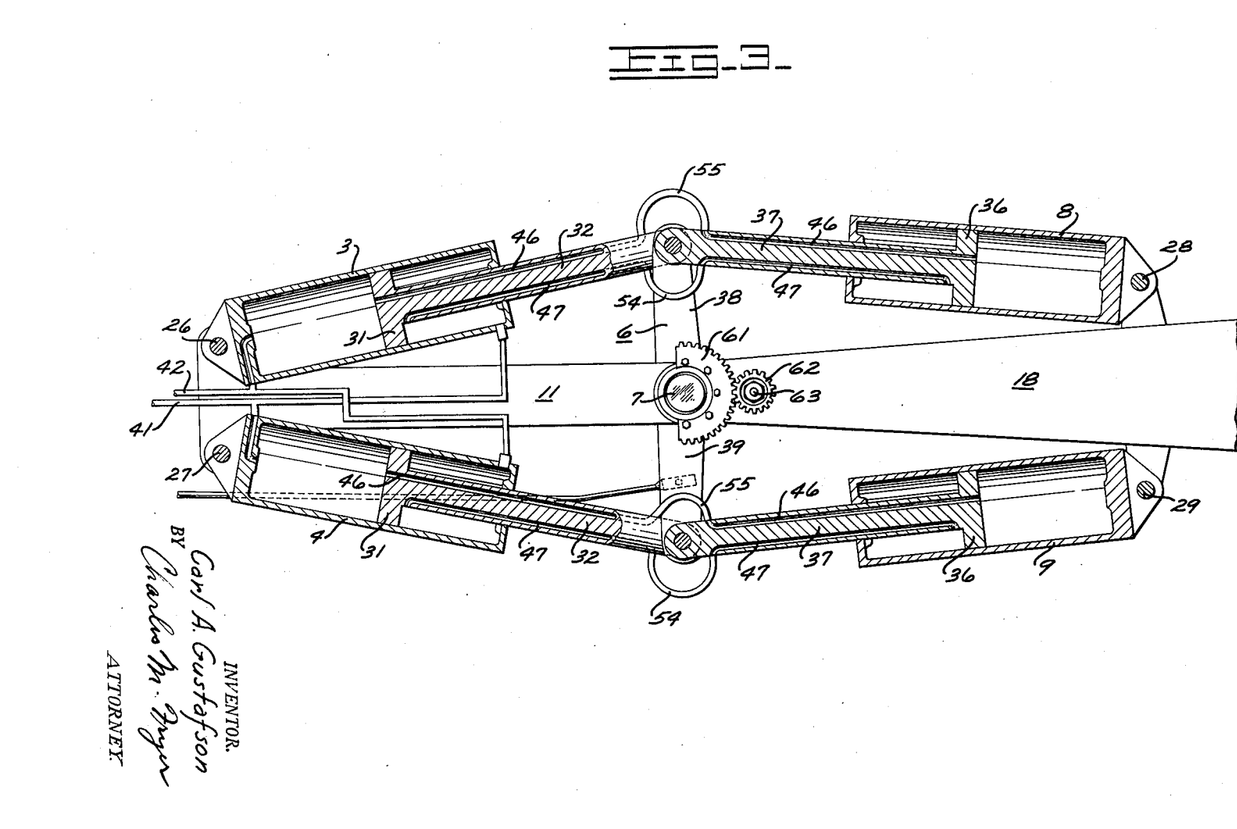
Fig. 3 is a schematic horizontal sectional view of the hydraulic jacks which serve to effect steering of the tractor.

The jacks 3 and 4 are each pivoted at one end to the bracket 11 as by pins 26 and 27 respectively; whereas, the jacks 8 and 9 are each pivoted to the scraper draft frame 18 as by pins 28 and 29 respectively, this arrangement being clearly shown in Fig. 3 of the drawings. Pistons 31 and rods 32 are associated with the jacks 3 and 4 and the rods 32 are pivotally connected to lower arms of lever 6, one of which is shown at 34 in Fig. 2. Corresponding pistons 36 and rods 37 are associated with the hydraulic jacks 8 and 9 and the rods 37 are pivotally connected to upper arms 38 and 39 of lever 6.

It is desirable that all four of the hydraulic jacks have the same length stroke in order to accomplish proper steering of the tractor. Since the spacing of the pivotal connections 26 and 27 for jacks 3 and 4 is less than the spacing of the pivotal connections 28 and 29 for the jacks 8 and 9, the arms of the lever 6 are disposed at a slight angle toward the pivots 26 and 27 to equalize the distances between the opposite ends of each of the several jacks when the steering mechanism is in a central position as shown in Fig. 3.

To effect turning of the tractor relative to the scraper, the jacks in each pair operate oppositely to each other. For example, when the jacks 3 and 8 are retracted, the jacks 4 and 9 are extended, swinging the tractor to the right relative to the scraper as illustrated in Fig. 1. Conversely, when fluid is directed to the jacks to effect steering to the left, then the jacks 4 and 9 are retracted and the jacks 3 and 8 are extended. The jacks 3 and 8 alone or the jacks 4 and 9 alone are capable of effecting the steering just described. Jacks are employed in pairs, as shown, to obtain a high turning torque with jacks of minimum size and capacity.

The conduit system associated with the jacks is designed to eliminate unnecessary external piping and is diagrammatically illustrated in Fig. 3. Power lines 41 and 42, leading from a source of fluid under pressure, are associated with the jacks 3 and 4 to direct fluid simultaneously to all of the jacks by way of fluid directing passages in the piston rods 32 and 37. Pressure in line 41 retracts the pistons 31 and 36 in jacks 3 and 8 and extends the pistons 31 and 36 in the jacks 4 and 9. Fluid pressure directed through the power line 42 will extend the pistons 31 and 36 of the jacks 3 and 8 and retract the pistons 31 and 36 of the jacks 4 and 9.

Figure 4:
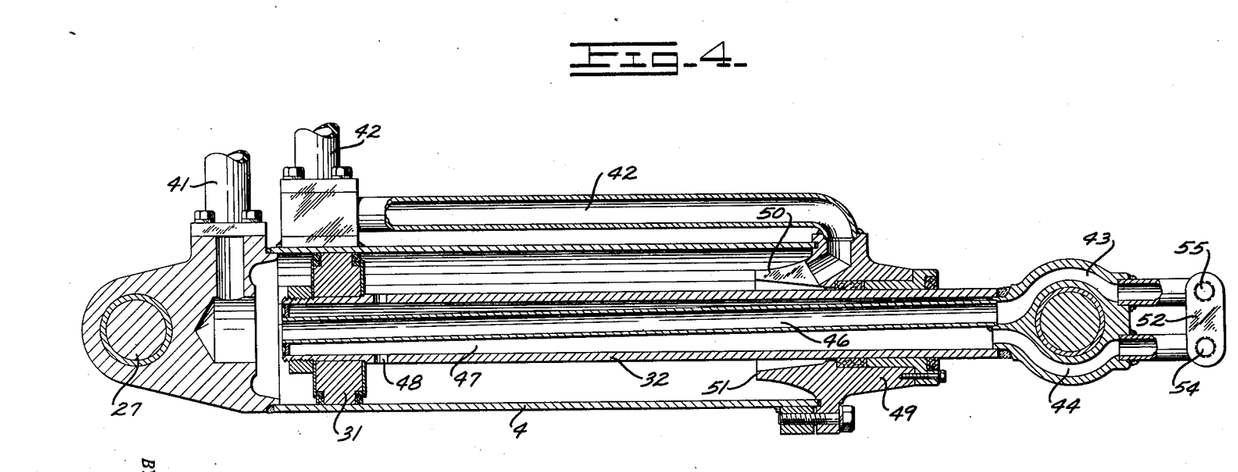
Fig. 4 is an enlarged sectional view taken through one of the hydraulic jacks.

The hydraulic jack shown in Fig. 4 of the drawings represents the jack shown at 4 in Fig. 3 but is typical of any of the jacks 3, 4, 8 and 9. Its piston rod 32 adjacent its pivotal connection with lever arms 6 is provided with passages 43 and 44. Passage 43 communicates with a pipe 46 located within the piston rod and serves to connect passage 43 with the cylinder beyond the piston. Passage 44 communicates with the piston rod which is hollow to provide a passage 47 and, as shown in Fig. 4, the passage 47 communicates with the cylinder on the opposite side of the piston by way of ports 48 located in the piston rod adjacent the piston. The rod end of each of the jacks is closed by a member 49 which is provided with suitable slots 50 which serve to permit the flow of fluid between the power line 42 and the passage 47 in the piston rods when the piston rod is fully extended and the piston abuts a face 51 of the member 49.

The passages 43 and 44 in the piston rods 32 of jacks 3 and 4 communicate with corresponding passages in the piston rods 37 of jacks 8 and 9 by way of junction blocks 52 and 53 (Fig. 2), the junction blocks being coupled together by suitable flexible hose couplings 54 and 55, only one of which is shown in Fig. 2 of the drawings and both of which are shown schematically in Fig. 3. Thus, when fluid is directed through the power line 41 to retract the pistons associated with the jacks 3 and 8 and at the same time extending the pistons associated with the jacks 4 and 9, the fluid from power line 41 will first enter the head end of jack 4 and the rod end of jack 3. From the rod end of jack 3, fluid will enter passage 47 in rod 32 and then will flow to a corresponding passage 47 in rod 37 by way of cored passage 44, junction blocks 52 and 53, and flexible hose coupling 54. Consequently, fluid from power line 41 will be directed to the rod ends of both the hydraulic jacks 3 and 8. At the same time fluid from power line 41 is directed to the head end of jack 4 where it will flow through passage 46 of piston rod 32 and then a corresponding passage 46 in piston rod 37 of jack 9 by way of cored passages 43, junction blocks 52 and 53, and the flexible hose 55. As a result, fluid pressure is exerted at the head ends of both the jacks 4 and 9 and at the rod ends of both the jacks 3 and 8. When fluid is directed through oppositely arranged power line 42, it flows simultaneously to all four jacks to extend the piston rods of jacks 3 and 8 and to retract the piston rods of jacks 4 and 9. When fluid is directed through either power line, the displaced fluid from the jacks is returned to the source of supply by way of the other line.

In order to provide a stable connection between the tractor and scraper when the vehicle is traveling in a straight forward direction, it is desirable that the arms of the lever 6 be substantially normal to the longitudinal axis of the vehicle as is shown in Fig. 3 of the drawings. Due to the fact that frictional drag of the fluid flowing through the passages in the piston rods to the different hydraulic jacks could result in a pressure drop of the fluid supplied to the jacks which are farthest from the pressure source, the pressure acting on the jacks could be unequal and the pistons in the jacks would not all move at the same rate. Were this to occur, it could result in the arms of the lever 6 failing to return to normal when the vehicle is traveling in a straight forward direction. To prevent such non-uniform action and to insure synchronous operation of all of the jacks, the lever 6 is geared to the bracket 11 to cause it to pivot about the axis of king pin 7 at one-half the angular speed that the bracket 11 pivots about the axis of the king pin. This gear ratio insures a 90° position of the lever 6 when the tractor and scraper are aligned. The gearing is shown in Figs. 2 and 3 as a quadrant gear 61 carried on bracket 11 and meshing with a pinion 62 fixed to a shaft 63. Shaft 63 is journaled in spaced bearings supported in the scraper draft frame 18. Directly below and also fixed to shaft 63 is a pinion 64 (Fig. 2) which meshes with a segment gear 66 rigidly secured to lever 6.

This gearing effects a two to one ratio between the angular movement of bracket 11 and lever 6. Consequently, as the hydraulic jacks are actuated, the tractor and its bracket 11 will turn about the king pin 7 at twice the speed and through double the angular distance of the lever 6. Therefore, with this arrangement and when the tractor is traveling in a straight forward direction, the arms of lever 6 will always be substantially normal to the longitudinal axis of the vehicle, thus, always providing a stable connection between the tractor and the scraper. Moreover, with this positive gear drive between bracket 11 and lever 6, the pistons in the respective hydraulic jacks must all move synchronously and at the same rate regardless of any pressure drop in the fluid to any particular jack.

Figure 5:
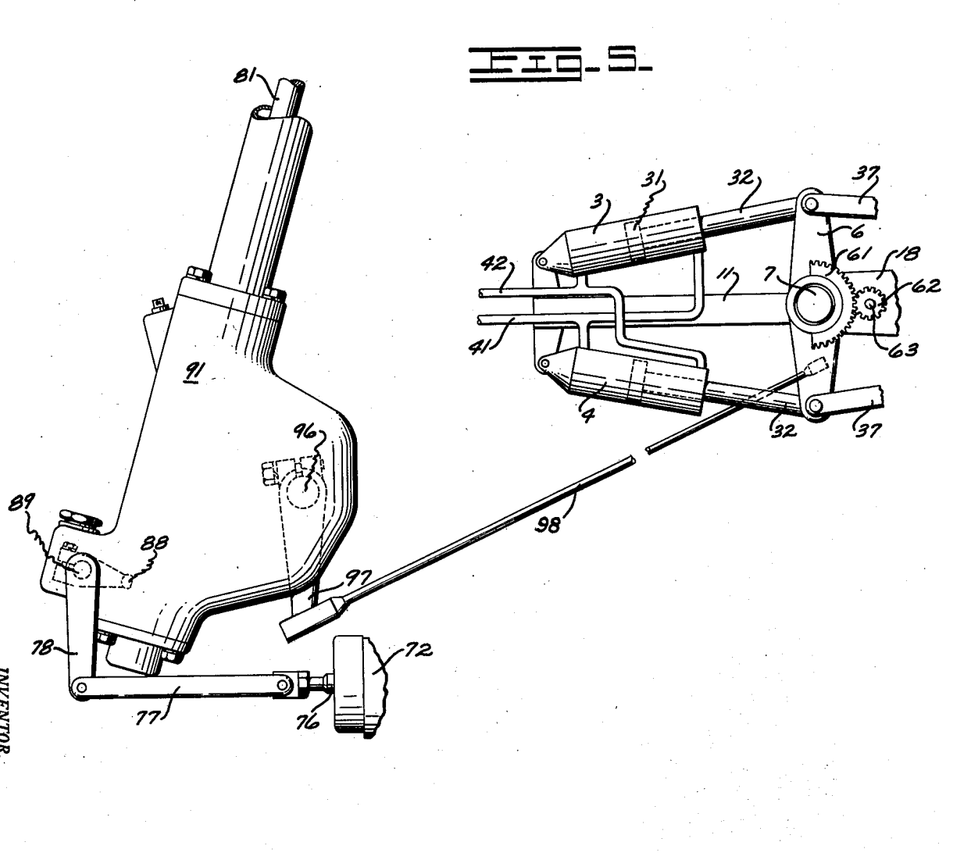
Fig. 5 is a diagrammatic illustration of the composite steering mechanism for the two-wheel tractor comprising the steering wheel and the hydraulic jacks.

The general steering arrangement is illustrated schematically in Fig. 5 and comprises a control valve 72 and a valve spool 76 adapted for reciprocal movement therein to direct fluid under pressure to power lines 41 and 42 thereby actuating the jacks in a manner previously described. Valve spool 76 is actuated through link members 77 and 78 from a manually controlled steering mechanism enclosed within a housing 91.

Figures 6, 7:
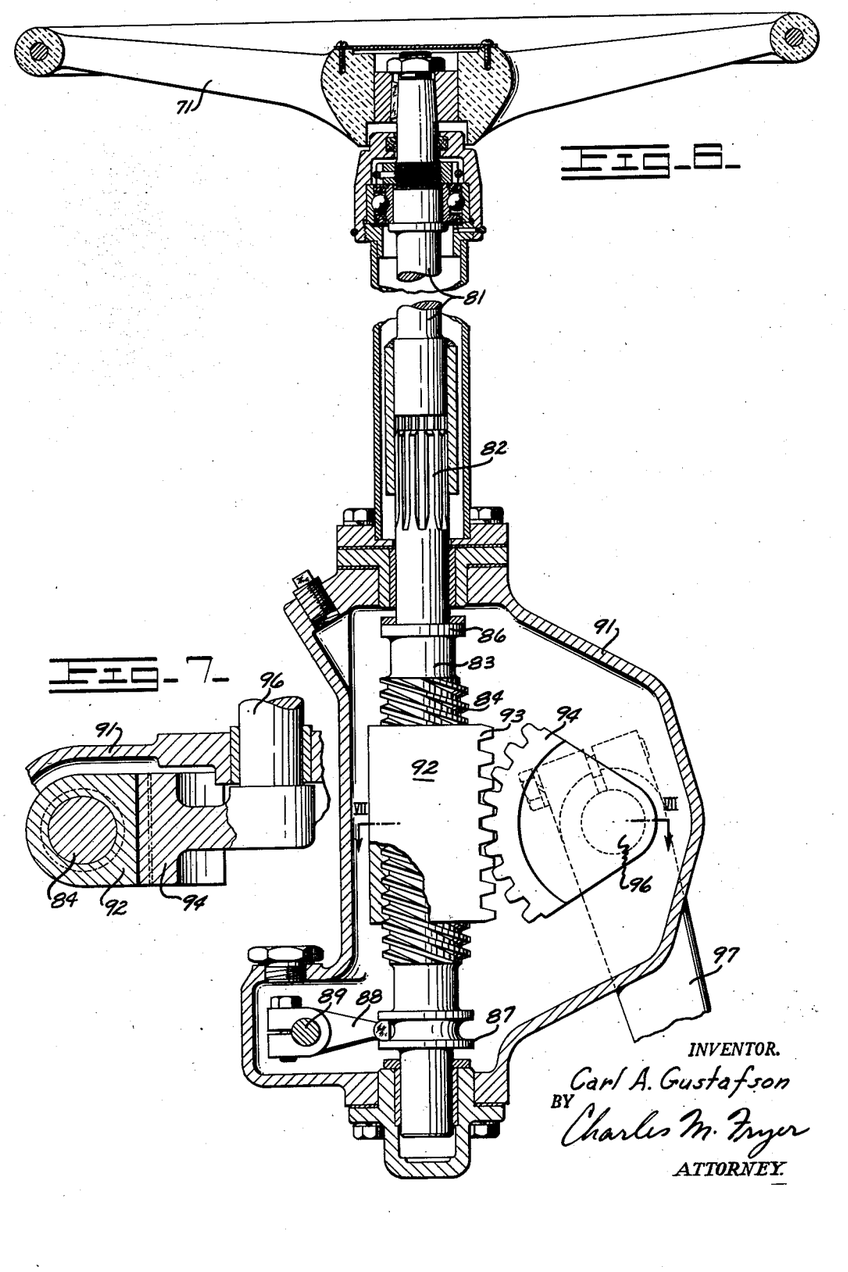
Fig. 6 is an enlarged sectional view of the tractor steering wheel.
Fig. 7 is a fragmentary sectional view taken in a plane indicated by the line VII—VII in Fig. 6.

As is best illustrated in Fig. 6, the manual steering mechanism comprises a steering wheel 71 non-rotatably secured to a steering post 81 having a telescopic splined connection 82 with a coaxially aligned shaft 83. Shaft 83 is provided with a threaded portion 84 interposed between a pair of spaced collars 86 and 87. Collar 87 is provided with a groove in which is received an end of a lever 88 that is rigidly secured to a shaft 89. Shaft 89 extends through a wall of the housing member 91 and has rigidly secured to its outer end the lever 78 shown in Fig. 5. A nut 92 having threaded engagement with the threaded portion of shaft 83 is provided with a straight rack gear 93 which meshes with a segment gear 94. Segment gear 94 is fixed to a shaft 96, journaled in and extending through housing 91. Rigidly secured to the outer end of the shaft 96 which extends through housing 91 is a lever 97, the lever 97 being pivotally connected to one end of a rod 98, the opposite end of which is pivotally connected to one arm of lever 6. Link 98, and lever 97 may be referred to as follow-up linkage serving automatically to return the spool valve 76 to a neutral position whenever the steering wheel is not in motion.

In operation, turning of steering wheel 71 effects axial movement of shaft 83, such movement being limited by engagement of collar 86 with a shoulder of housing 91 in one direction and in the opposite direction by engagement of collar 87 with a shoulder of housing 91. Nut 92 is held against vertical movement with shaft 83 during initial turning of the steering wheel 71 by its engagement with segment 94, the segment being held against movement by the follow-up linkage which connects lever 97 with lever 6. Hence, nut 92 can move axially with shaft 83 only when lever 6 rocks about the axis of king pin 7 in response to actuation of the steering jacks. Therefore, initial turning of the steering wheel 71 turns the shaft 83 and advances it axially in one direction or the other.

Assuming the steering wheel 71 to be turned clockwise to raise the shaft 83, then collar 87 which controls lever 88 will rise and through lever 78 and link 77 will move spool valve 76 to the right to direct fluid under pressure to power line 41. This effects steering to the right and incidently also causes swinging movement of lever 6 about the axis of king pin 7. This movement will effect the follow-up linkage connecting lever 6 with lever 97 (Fig. 5) and will result in the segment 94 rocking with the shaft 96 and by its engagement with rack 93 of nut 92, the shaft 83 will be returned to a neutral position without turning of steering wheel 71. Returning of shaft 83 to its neutral position shown in Fig. 6 will, through levers 88 and 78, position spool valve 76 of control valve 72 to a neutral position and thereby shut off the flow of fluid to either of the power lines 41 and 42 which are connected to the pairs of hydraulic jacks. Thus, as the steering wheel 71 is rotated, the control valve will operate to direct fluid to the jacks for effecting steering of the tractor relative to the scraper. However, when the steering wheel is held stationary in any position, the control valve 72 will automatically be returned to its neutral position.

With the arrangement shown in Fig. 6, in the event of failure of the fluid pressure to the hydraulic jacks, the tractor will be locked in steered position, at least for a sufficient time for the operator to apply the brakes to stop the vehicle train. This is so since there is a direct connection of the linkage between lever 97 and lever 6. Upon such failure, tendency of the tractor to swing relative to the trailer is resisted through this linkage between lever 97 and lever 6. This linkage becomes substantially locked by virtue of connection thereof to the sets of gearing 93, 94, and 61, 62, 64 and 66, and will remain locked unless the forces to which it may be subjected upon power failure as the vehicle train moves are great enough to break the same. However, there will be sufficient time for the operator to apply the brakes before such breakage should occur. The collars 86 and 87 also serve to prevent damage to the spool valve 76, particularly in the case of oil failure of the fluid supply circuit as they prevent any tendency of the steering mechanism to pull the spool entirely out of its housing. The fluid supply circuit for this steering control is diagrammatically shown in Fig. 8 of the drawings in which the control valve 72 and a pilot valve 73 are shown in section. Spool 76, which is axially slidable in the control valve 72, serves to open and close passages for directing fluid to either of the power lines 41 and 42. Control valve 72 is provided with a supply passage 106 connected to a pipe 107. Pipe 107 can be supplied with fluid from either a large rotary sliding vane type pump 108 or a smaller rotary sliding vane type pump 109. Both pumps 108 and 109 receive fluid from a supply tank 75 by way of inlet line 110 and are driven from a suitable power take-off from the tractor. When the steering wheel 71 is rotated slowly, only the discharge from the small pump 109 is directed to the pipe 107 and during this time the full discharge of the large pump 108 is returned to the supply tank 75. However, as the speed or rotation of the tractor steering wheel 71 is increased, the discharge from both pumps will be directed to pipe 107 to increase the turning speed of the tractor relative to the scraper. This is accomplished by the pilot valve 73 which has a spring loaded plunger 112, the end of the plunger carrying a roller which rides on a ramp 126 of spool valve 76. Opposed to spring loaded plunger 112 is a similar reaction plunger 113 which serves to prevent binding of the spool valve 76 as it is axially reciprocated within the control valve 72.

Figure 8:
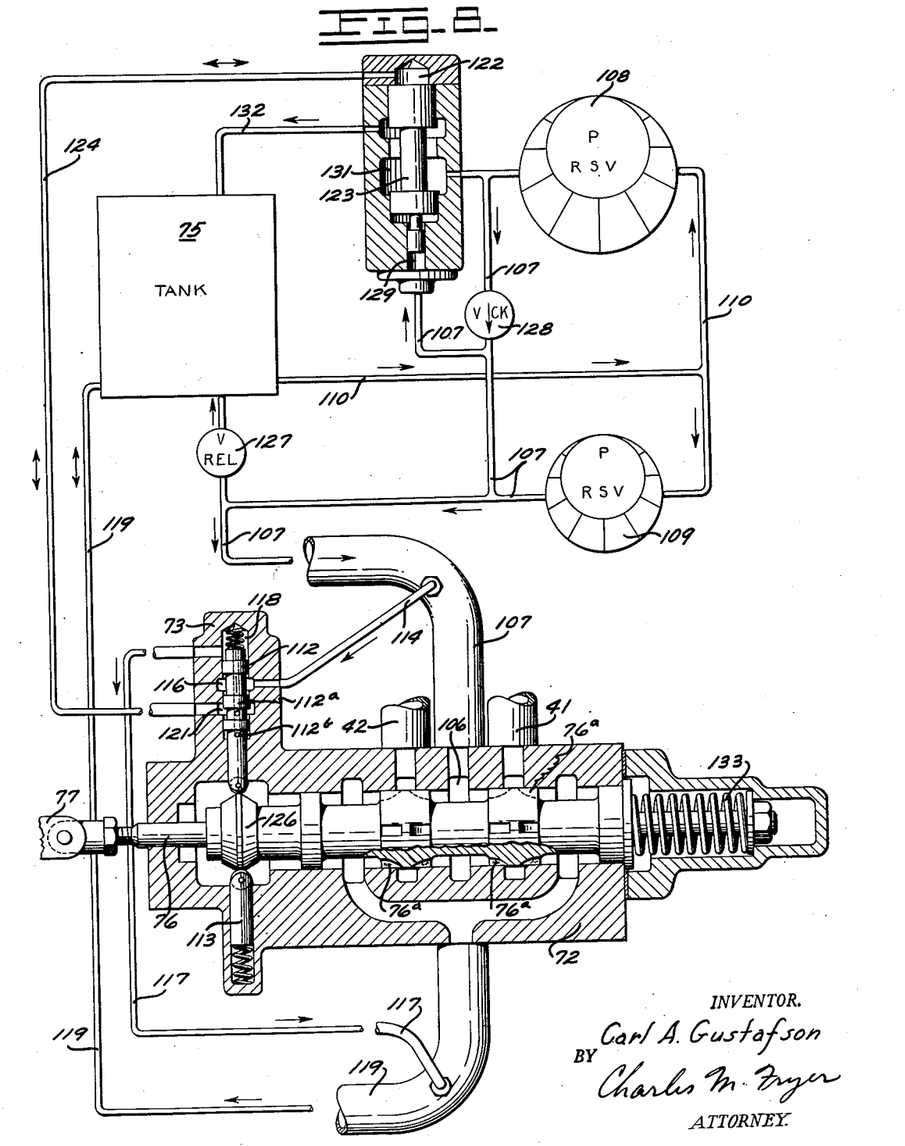
Fig. 8 is a schematic disclosure of the fluid supply circuit.

A pipe 114 connects pipe 107 with a chamber 116 in pilot valve 73, while a pipe 117 connects a low pressure chamber 118 in pilot valve 73 with a return line 119, which return line connects the control valve 72 with supply tank 75. A chamber 121 in pilot valve 73 is connected with a chamber 122 in a housing enclosing a shuttle valve 123 by means of a pipe 124.

In operation, if the steering wheel is being turned slowly, the spool valve 76 will be moved to the right or left, as viewed in Fig. 8, in order to direct fluid pressure from pipe 107 to either of the power lines 41 or 42 depending upon the direction of turning of the wheel. As long as the steering wheel is rotated slowly, the spring loaded plunger 112 of pilot valve 73 will be thrust against the ramp 126 of spool valve 76. During this time the discharge from small pump 109 will be directed through pipe 107 to the control valve 72 and then to either one of the power lines 41 or 42 depending upon which direction the spool valve 76 has been moved. The pressure in pipe 107 will also be directed to the chamber 116 of pilot valve 73, in this instance having no effect. A pressure relief valve 127 controls the maximum working pressure in the pipe 107 and a check valve 128 prevents fluid on the discharge side of small pump 109 from returning to supply tank 75 unless the pressure is sufficient to open the relief valve.

Fluid on the discharge side of pump 109 is directed to a chamber 129 in the housing of shuttle valve 123. However, the diameter of chamber 129 is considerably smaller than the diameter of chamber 122 which is for a purpose presently to be described. When only the discharge of the small pump 109 is being directed to the pipe 107, the full discharge from the large supply pump 108 is directed to a chamber 131 of shuttle valve 123 and from chamber 131 the fluid is free to return to the tank 75 by way of pipe 132. If the steering wheel 71 is turned more rapidly, the spool valve 76 will move until the spring loaded plunger 112 of pilot valve 73 will ride off the ramp 126. Fluid pressure in chamber 116 from pipe 114 will now be free to flow to chamber 121 and thence through line 124 to chamber 122 of the shuttle valve. At this time the pressure from pump 109 is effective in both chambers 122 and 129 of the shuttle valve. As the pressure in chamber 122 acts against a larger area of the valve than the pressure in chamber 129, the valve will move downwardly to shut off the discharge from large pump 108 to supply tank 75. As a result, the discharge from pump 108 will flow through the check valve 128 and the combined discharge of both pumps will be directed to pipe 107 to accelerate steering.

When the tractor has been turned the desired amount relative to the scraper and the steering wheel 71 is no longer in motion, the spool valve will be automatically returned to the neutral position as is shown in Fig. 8 by the follow-up linkage previously described. At this time, the spring loaded plunger 112 of pilot valve 73 will again rest on the crown of ramp 126 and any fluid in chamber 118 will be returned toward the tank by way of pipe 117 and return line 119. Furthermore, spring loaded plunger 112 is provided with an axial bored passage 112a and spaced radially disposed ports 112b serving to vent fluid which leaks past the lands particularly when the plunger is reciprocated in its bore. The vent passages in the plunger 112 serve also to direct the return to supply tank 75 of fluid in chamber 122 which is displaced when the shuttle valve 123 is returned to the position shown in Fig. 8. The return is through line 124, vent passages in plunger 112, low pressure chamber 118 and pipe 117.

The spool valve 76 is shown in Fig. 8 in a neutral position and as having a spring 133 which acts in a conventional manner to return the valve to its neutral position when it has been displaced in either direction. In this neutral position of the valve, the fluid in all of the hydraulic jacks will tend to drain through the lines 41 and 42 towards the spool valve. It is possible that through leakage in the valve or in any part of the system, some of the fluid could escape from the jacks when they are not engaged in turning so that they would not respond properly when placed in service to effect turning. In order to prevent this loss of fluid and to maintain the jacks fully primed at all times, the lands of the spool 76 which close the ports leading from the lines 41 and 42 when the valve is in its neutral position are provided with notches shown at 76a in their opposite edges which serve to communicate fluid under pressure entering through the line 107 to the lines 41 and 42 and to the jacks. As the notches 76a are provided on both sides of the lands, they serve at once to communicate pressure to the jacks and to relieve excess fluid from the jacks. Due to the restricted orifices created by the notches, a substantial positive pressure is always maintained in the jacks though the bulk of the output from the pump is by-passed through the notches and returns by way of the line 119 to the tank 75.

With the above described hydraulic circuit, it is possible to effect slow steering movement by turning the steering wheel slowly, but if the steering wheel is turned rapidly, the supply of fluid to the lines 41 and 42 is increased to accelerate the steering movement.

Figure 9:
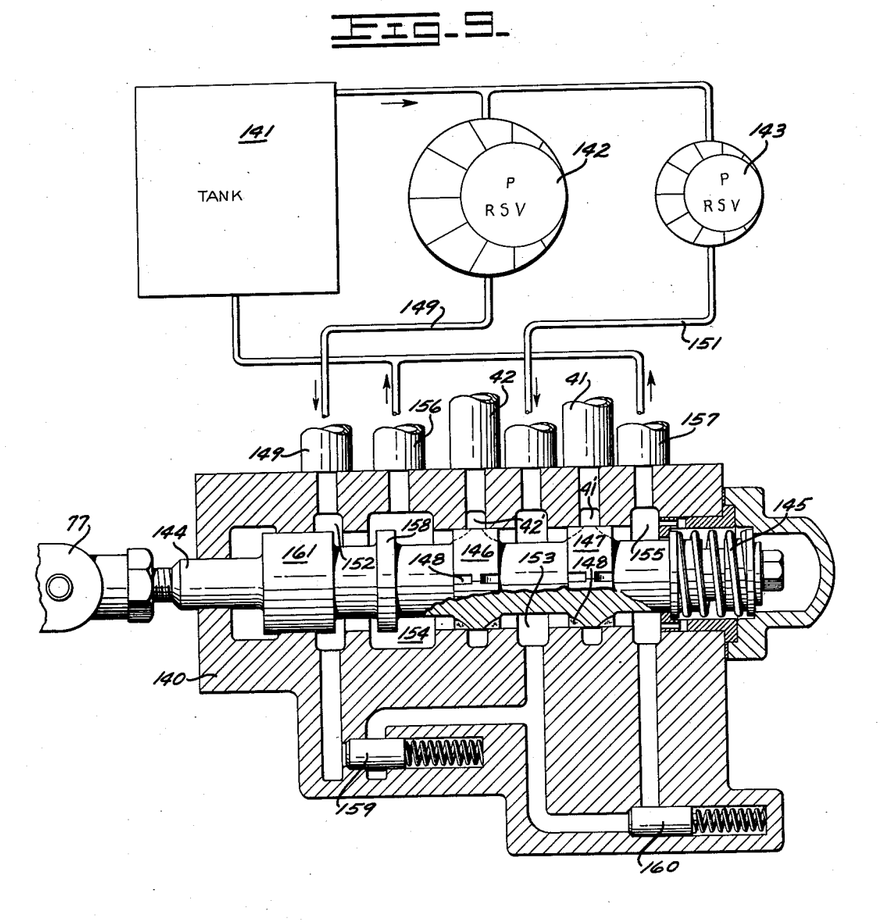
Fig. 9 is a schematic disclosure of a modified form of the control valve and hydraulic circuit.

Fig. 9 illustrates a modified form of control valve and hydraulic circuit comprising a fluid supply tank 141, a pair of rotary sliding vane-type pumps 142 and 143 for supplying fluid under pressure to a control valve body 140. The control valve is provided with an elongated bore for the sliding reception of a valve spool 144 pivotally connected at one end to the link 77, illustrated in Fig. 5. Sliding of the valve spool in the bore effects distribution of the fluid to the jacks through conduits 41 and 42 to effect steering of the tractor in the manner previously described.

The valve spool is provided with a plurality of raised lands 161, 158, 146 and 147 which cooperate with recesses 152, 154, 42', 153, 41', and 155 formed in the bore of the valve body to effect the desired direction of the fluid therethrough. A spring 145 is associated with one end of the valve spool normally to urge the valve to the central or neutral position illustrated. Fluid from the reservoir 141 is admitted to the pumps 142 and 143 by means of a common supply line as illustrated and is directed from the pump 142 to the recess 152 in the valve bore by way of a communicating line 149, while fluid from the pump 143 is directed to the recess 153 by way of a communicating line 151.

With the valve spool in the neutral position illustrated, fluid from the pump 142 flows from recess 152 into recess 154 and is returned to the supply tank 141 by way of a return line 156. Fluid from pump 143 entering recess 153 flows into recesses 41' and 42' through a number of radially spaced notches 148 on the lands 146 and 147. Fluid in the recess 41' flows through the notches 148 into recess 155 and thence to the supply tank, while the fluid in the recess 42' is free to flow into the recess 154 and is returned to the tank 141 by way of a return line 156.

In operation, the speed at which the steering wheel is turned determines the amount of axial movement of the valve spool 144 in the same manner as previously described. When the valve spool is moved to the right, as viewed in Fig. 9, to effect slow turning of the vehicle, the lands 146 and 147 enter the bores adjacent to recesses 153 and 155 respectively, so that all of the fluid entering recess 153 from the pump 143 is directed through the power line 41 to the jacks. At this time, fluid entering recess 152 from the pump 142 is still free to flow into recess 154 and is returned to tank 141 by way of line 156. More rapid turning of the steering wheel moves the spool valve farther to the right to a position where the land 161 enters the bore between recesses 152 and 154 preventing the fluid in the recess 152 from returning to the supply tank. The resulting pressure rise opens a spring pressed unloading valve 159 permitting fluid from recess 152 to flow into recess 153 and thence through the power line 41. Under this condition, all of the fluid from the pumps will be directed to the jacks through power line 41 to effect faster steering in response to the increased turning speed of the steering wheel.

In a similar manner, rotation of the steering wheel in the opposite direction effects movement of the spool valve 144 to the left preventing fluid in the recess 153 from entering recess 41' thus directing the entire output of the pump 143 to recess 42' and thence through conduit 42. More rapid steering is accomplished by further movement of the valve spool to the left until land 158 enters the bore between recesses 152 and 154 preventing communication therebetween. At this time, the unloading valve 159 opens permitting the entire output of both pumps to be directed through the power line 42 by way of recesses 153 and 42'. The maximum pressure within the system is limited by a pressure relief valve illustrated at 160 which when open permits fluid in recess 153 to flow into recess 155 and return to supply tank 141 through line 157.

In this modified form, by incorporating the unloading valve in the control valve body, considerable exterior piping has been eliminated resulting in a quicker acting control valve due to the shortening of communicating passages.

I claim:

1. A steering mechanism operable to impart turning movement about the pivotal draft connection between a tractor and a drawn implement which comprises a lever pivoted coaxially with the draft connection and extending outwardly from opposite sides thereof, a pair of fluid actuated jacks pivoted at one end to opposite sides of the tractor and at their opposite ends to opposite ends of the lever, a second pair of jacks pivoted at one end to opposite sides of the implement and at their opposite ends to the ends of the lever, and means to extend the one jack in each pair on one side of the tractor and implement and simultaneously retract the other jacks.

2. A steering mechanism operable to impart turning movement about the pivotal draft connection between a tractor and a drawn implement which comprises a lever pivoted coaxially with the draft connection and extending outwardly from opposite sides thereof, a pair of fluid actuated jacks pivoted at one end to opposite sides of the tractor and at their opposite ends to opposite ends of the lever, a second pair of jacks pivoted at one end to opposite sides of the implement and at their opposite ends to the ends of the lever, means to extend one jack in each pair on one side of the tractor and implement and simultaneously retract the other jacks, and gear means to control the swinging movement of the lever relative to the angular displacement of the tractor and implement about the draft connection.

3. A steering mechanism operable to impart turning movement about the pivotal draft connection between a tractor and a drawn implement which comprises a lever pivoted coaxially with the draft connection, power actuated extensible means interposed between the lever and one side of the tractor, and similar means between the lever and the same side of the implement, said means being operable in opposition to each other to impose turning movement about the draft connection.

4. A steering mechanism operable to impart turning movement about the pivotal draft connection between a tractor and a drawn implement which comprises, a lever supported for pivotal movement at a point adjacent the draft connection to extend in a generally horizontal position, a fluid actuated jack between an end of the lever and one side of the tractor, a fluid actuated jack between the same end of the lever and the same side of the implement, and means to effect extension and retraction of the jacks in opposition to each other.

5. A steering mechanism operable to impart turning movement about the pivotal draft connection between a tractor and a drawn implement which comprises, a lever pivoted co-axially with the draft connection, a fluid actuated jack between an end of the lever and one side of the tractor, a fluid actuated jack between the same end of the lever and the same side of the implement, and means to effect simultaneous extension and simultaneous retraction of the jacks.

6. A steering mechanism operable to impart turning movement about the pivotal draft connection between a tractor and a drawn implement which comprises, a lever pivoted substantially co-axially with the draft connection, a fluid actuated jack between an end of the lever and one side of the tractor, a fluid actuated jack between the same end of the lever and the same side of the implement, means to effect simultaneous extension and simultaneous retraction of the jacks, and gear means associated with the lever to control the angular displacement of the lever with relation to the angle of turning between the tractor and implement.

7. A steering mechanism operable to impart turning movement about the pivotal draft connection between a tractor and a drawn implement which comprises, a lever pivoted substantially co-axially with the draft connection, a fluid actuated jack between an end of the lever and one side of the tractor, a fluid actuated jack between the same end of the lever and the same side of the implement, means to effect simultaneous extension and simultaneous retraction of the jacks, and gear means between the lever and the tractor to compel the lever to swing through one-half the turning angle between the tractor and implement to insure synchronous action of the two jacks.

CARL A. GUSTAFSON.

REFERENCES CITED

The following references are of record in the file of this patent:

UNITED STATES PATENTS

| Number | Name | Date |
|---|---|---|
| 2,130,274 | Harrison et al. | Sept. 13, 1938 |
| 2,362,262 | French | Nov. 7, 1944 |
| 2,368,202 | Clark | Jan. 30, 1945 |
| 2,406,944 | Choate et al. | Sept. 3, 1946 |
| 2,429,185 | Hukill | Oct. 14, 1947 |